(12) United States Patent
Jung et al.

(10) Patent No.: US 11,474,326 B2
(45) Date of Patent: Oct. 18, 2022

(54) OPTICAL IMAGING SYSTEM

(71) Applicant: Samsung Electro-Mechanics Co., Ltd., Suwon-si (KR)

(72) Inventors: Jin Hwa Jung, Suwon-si (KR); Tae Youn Lee, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/114,514

(22) Filed: Aug. 28, 2018

(65) Prior Publication Data
US 2019/0121061 A1 Apr. 25, 2019

(30) Foreign Application Priority Data

Oct. 23, 2017 (KR) .......................... 10-2017-0137676

(51) Int. Cl.
*G02B 3/02* (2006.01)
*G02B 13/18* (2006.01)
(Continued)

(52) U.S. Cl.
CPC .................. *G02B 9/62* (2013.01); *G02B 7/04* (2013.01); *G02B 13/0045* (2013.01); *G02B 27/0037* (2013.01)

(58) Field of Classification Search
CPC . G02B 1/041; G02B 9/62; G02B 9/64; G02B 9/00; G02B 13/0045; G02B 13/18; G02B 13/002
(Continued)

(56) References Cited

U.S. PATENT DOCUMENTS 9,402,032 B2  7/2016 Dror et al.
9,488,808 B1* 11/2016 Chen .................. G02B 13/0045
(Continued)

FOREIGN PATENT DOCUMENTS

CN  203838391 U    9/2014
CN  105204138 A   12/2015
(Continued)

OTHER PUBLICATIONS

Chinese Office Action dated Nov. 4, 2020 in counterpart Chinese Patent Application No. 201811237812.2 (12 pages in English, 16 pages in Chinese).

(Continued)

*Primary Examiner* — Mahidere S Sahle
(74) *Attorney, Agent, or Firm* — NSIP Law

(57) ABSTRACT

An optical imaging system includes a first lens having an object-side surface that is convex; a second lens having a refractive power; a third lens having a refractive power; a fourth lens having a refractive power; a fifth lens having a refractive power and an object-side surface that is concave; and a sixth lens having a refractive power and an object-side surface that is concave, wherein the first lens through the sixth lens are sequentially disposed in numerical order from an object side of the optical imaging system toward an imaging plane, and the optical imaging system satisfies the conditional expressions $0.7<TL/f<1.0$ and $TL/2<f1$, where TL is a distance from the object-side surface of the first lens to the imaging plane, f is an overall focal length of the optical imaging system, and f1 is a focal length of the first lens.

6 Claims, 9 Drawing Sheets

(51) Int. Cl.
*G02B 9/62* (2006.01)
*G02B 7/04* (2021.01)
*G02B 27/00* (2006.01)
*G02B 13/00* (2006.01)

(58) Field of Classification Search
USPC .................................................. 359/708, 713
See application file for complete search history.

(56) References Cited

U.S. PATENT DOCUMENTS

| | | | |
|---|---|---|---|
| 10,175,461 B1* | 1/2019 | Lai | ........................... G02B 9/62 |
| 2014/0118817 A1 | 5/2014 | Jung et al. | |
| 2014/0185141 A1* | 7/2014 | Lee | ..................... G02B 27/646 |
| | | | 359/557 |
| 2014/0185150 A1 | 7/2014 | Shinohara et al. | |
| 2016/0091694 A1 | 3/2016 | Tang et al. | |
| 2016/0187620 A1 | 6/2016 | Huang | |
| 2016/0187621 A1 | 6/2016 | Chen | |
| 2016/0187622 A1 | 6/2016 | Huang | |
| 2017/0090156 A1* | 3/2017 | Hsu | .................... G02B 13/0045 |
| 2017/0184822 A1 | 6/2017 | Shi | |
| 2017/0299846 A1 | 10/2017 | Lin et al. | |
| 2017/0307850 A1 | 10/2017 | Jhang et al. | |
| 2017/0315334 A1 | 11/2017 | Liao et al. | |
| 2017/0351064 A1 | 12/2017 | Chang et al. | |
| 2017/0371130 A1 | 12/2017 | Huang et al. | |
| 2018/0011293 A1* | 1/2018 | Hsueh | ................ G02B 13/0045 |
| 2018/0059372 A1 | 3/2018 | Cheng et al. | |
| 2018/0335549 A1 | 11/2018 | Dai et al. | |
| 2019/0033559 A1 | 1/2019 | Chang et al. | |

FOREIGN PATENT DOCUMENTS

| | | | | |
|---|---|---|---|---|
| CN | 106154495 A | 11/2016 | | |
| CN | 106199927 A | 12/2016 | | |
| CN | 106324804 A | 1/2017 | | |
| CN | 106526790 A | 3/2017 | | |
| CN | 107300747 A | 10/2017 | | |
| CN | 107329234 A | 11/2017 | | |
| EP | 2749925 A1 * | 7/2014 | ............... | G02B 9/62 |
| JP | 2012-155223 A | 8/2012 | | |
| KR | 10-1690481 B1 | 12/2016 | | |

OTHER PUBLICATIONS

U.S. Office Action dated Nov. 26, 2021 in corresponding U.S. Appl. No. 16/890,036. (8 pages in English).
United States Office Action dated May 3, 2022, in related Divisional U.S. Appl. No. 16/890,036.
Chinese Office Action dated May 17, 2022, in counterpart Chinese Patent Application No. 202111104985.9. (6 pages in English and 8 pages in Chinese).
Chinese Office Action dated Jul. 12, 2022, in counterpart Chinese Patent Application No. 202110029886.2 (6 pages in English and 7 pages in Chinese).

* cited by examiner

X-X'

OPTICAL IMAGING SYSTEM

CROSS-REFERENCE TO RELATED APPLICATIONS

This application claims the benefit under 35 USC 119(a) of Korean Patent Application No. 10-2017-0137676 filed on Oct. 23, 2017, in the Korean Intellectual Property Office, the entire disclosure of which is incorporated herein by reference for all purposes.

BACKGROUND

1. Field

This application relates to a telescopic optical imaging system including six lenses.

2. Description of Related Art

A telescopic optical system designed capture an image of a subject at a long distance has a significant size. For example, a ratio (TL/f) of a total length (TL) of the telescopic optical system to an overall focal length (f) of the telescopic optical system is 1 or more. Therefore, it is difficult to mount a telescopic optical system in a small electronic product such as a mobile communications terminal or other portable device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens having an object-side surface that is convex; a second lens having a refractive power; a third lens having a refractive power; a fourth lens having a refractive power; a fifth lens having a refractive power and an object-side surface that is concave; and a sixth lens having a refractive power and an object-side surface that is concave, wherein the first lens through the sixth lens are sequentially disposed in numerical order from an object side of the optical imaging system toward an imaging plane of the optical imaging system so that there is a first air gap between the first lens and the second lens, a second air gap between the second lens and the third lens, a third air gap between the third lens and the fourth lens, a fourth air gap between the fourth lens and the fifth lens, and a fifth air gap between the fifth lens and the sixth lens, and the optical imaging system satisfies the conditional expressions $0.7<TL/f<1.0$ and $TL/2<f1$, where TL is a distance from the object-side surface of the first lens to the imaging plane, f is an overall focal length of the optical imaging system, and f1 is a focal length of the first lens.

The first lens may have a positive refractive power.
The second lens may have a negative refractive power.
The fifth lens may have a negative refractive power.
An object-side surface of the second lens may be convex.
An object-side surface of the fourth lens may be concave.
An image-side surface of the fifth lens may be concave.
There may be an inflection point on either one or both of the object-side surface of the fifth lens and an image-side surface of the fifth lens.

An image-side surface of the sixth lens may be convex.
An object-side surface of the third lens or an object-side surface of the fourth lens may be spherical.

In another general aspect, an optical imaging system includes a first lens having an image-side surface that is concave; a second lens having a refractive power; a third lens having a refractive power; a fourth lens having a refractive power; a fifth lens having a refractive power; and a sixth lens having a refractive power and an object-side surface that is concave, wherein the first lens through the sixth lens are sequentially disposed in numerical order from an object side of the optical imaging system toward an imaging plane of the optical imaging system so that there is a first air gap between the first lens and the second lens, a second air gap between the second lens and the third lens, a third air gap between the third lens and the fourth lens, a fourth air gap between the fourth lens and the fifth lens, and a fifth air gap between the fifth lens and the sixth lens, and the optical imaging system satisfies the conditional expression $0.7<TL/f<1.0$, where TL is a distance from an object-side surface of the first lens to the imaging plane, and f is an overall focal length of the optical imaging system.

The optical imaging system may further satisfy the conditional expression $0<D45/TL<0.2$, where D45 is a distance from an image-side surface of the fourth lens to an object-side surface of the fifth lens.

The optical imaging system may further satisfy the conditional expression $1.5<Nd6<1.7$, where Nd6 is a refractive index of the sixth lens.

The optical imaging system may further satisfy the conditional expression $f2/f<-0.6$, where f2 is a focal length of the second lens.

The optical imaging system may further satisfy the conditional expression $2.0<f/EPD<2.7$, where EPD is an entrance pupil diameter of the optical imaging system.

The optical imaging system may further satisfy the conditional expression $|f2/f3|<1.3$, where f2 is a focal length of the second lens, and f3 is a focal length of the third lens.

In another general aspect, a optical imaging system includes a first lens having a refractive power; a second lens having a refractive power; a third lens having a refractive power; a fourth lens having a refractive power; a fifth lens having a refractive power; and a sixth lens having a refractive power; wherein the first lens through the sixth lens are sequentially disposed in numerical order from an object side of the optical imaging system toward an imaging plane of the optical imaging system, the refractive power of the second lens and the refractive power of the fifth lens have a same sign that is opposite to a sign of the refractive power of the first lens, the optical imaging system satisfies the conditional expression $0.7<TL/f<1.0$, where TL is a distance from the object-side surface of the first lens to the imaging plane, and f is an overall focal length of the optical imaging system.

The first lens may have a positive refractive power, and the second lens and the fifth lens each may have a negative refractive power.

An object-side surface of the first lens may be convex, an object-side surface of the fifth lens may be concave, and an object-side surface of the sixth lens may be concave.

An image-side surface of the second lens may be concave, and an image-side surface of the sixth lens may be concave.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
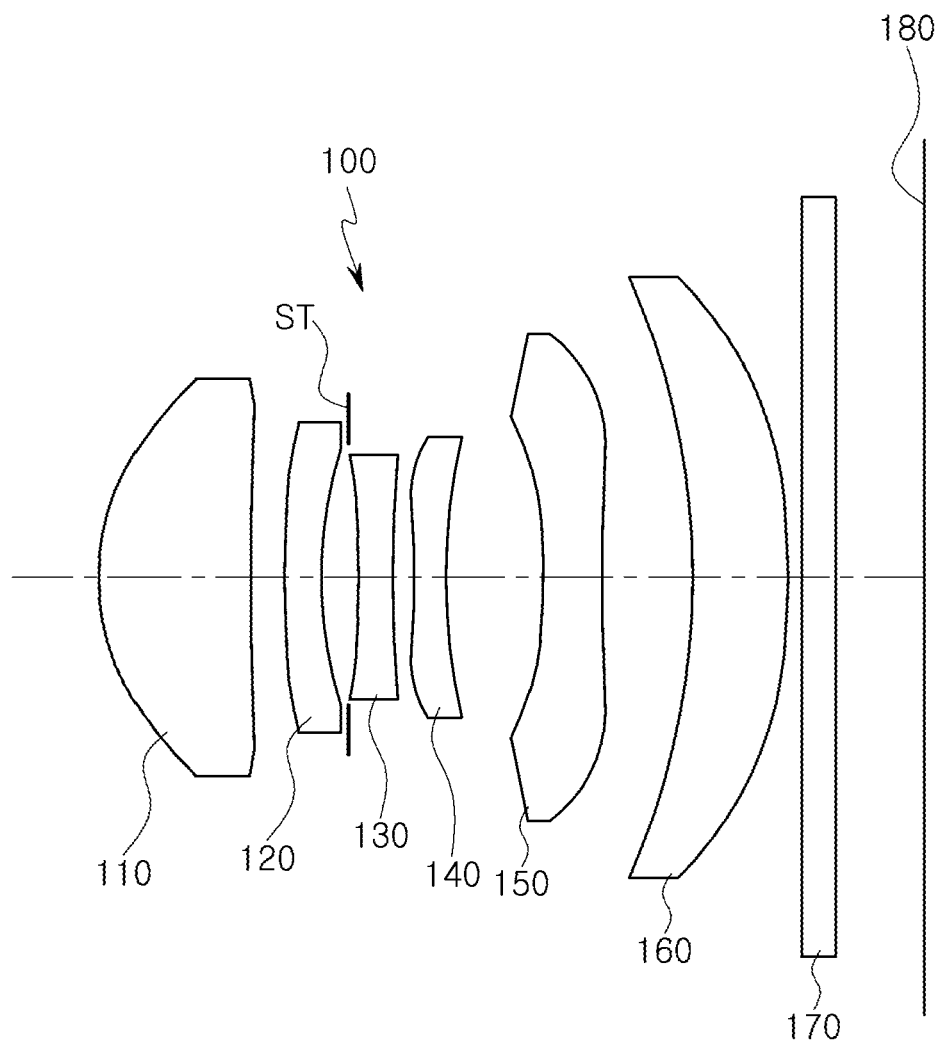
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In this application, a first lens is a lens closest to an object (or a subject), while a sixth lens is a lens closest to an imaging plane (or an image sensor). In addition, radii of curvature, thicknesses of lenses, TL, an IMG HT (a half of a diagonal length of the imaging plane), and focal lengths of the lenses are expressed in millimeters (mm). Further, thicknesses of the lenses, gaps between the lenses, and TL are distances measured along optical axes of the lenses. Further, in a description of the shapes of the lenses, a statement that a surface of a lens is convex means that at least a paraxial region of the surface is convex, and a statement that a surface of a lens is concave means that at least a paraxial region of the surface is concave. A paraxial region of a lens surface is a central portion of the lens surface surrounding the optical axis of the lens in which light rays incident to the lens surface make a small angle to the optical axis and the approximations $\sin \theta \approx \theta$, $\tan \theta \approx \theta$, and $\cos \theta \approx 1$ are valid. Therefore, although it may be stated that a surface of a lens is convex, an edge portion of the surface may be concave. Likewise, although it may be stated that a surface of a lens is concave, an edge portion of the surface may be convex.

In the examples described in this application, an optical imaging system includes six lenses. For example, the optical imaging system may include a first lens, a second lens, a third lens, a fourth lens, a fifth lens, and a sixth lens sequentially disposed in numerical order from an object side of the optical imaging system toward an imaging plane of the optical imaging system. The first lens through the sixth lens may be disposed so that there is a first air gap between the first lens and the second lens, a second air gap between the second lens and the third lens, a third air gap between the third lens and the fourth lens, a fourth air gap between the fourth lens and the fifth lens, and a fifth air gap between the fifth lens and the sixth lens. Thus, an image-side surface of one lens may not be in contact with an object-side surface of a next lens closer to the imaging plane.

The first lens may have a refractive power. For example, the first lens may have a positive refractive power. One surface of the first lens may be convex. For example, an object-side surface of the first lens may be convex.

The first lens may have an aspherical surface. For example, both surfaces of the first lens may be aspherical. The first lens may be made of a material having a high light transmissivity and an excellent workability. For example, the first lens may be made of plastic. However, a material of the first lens is not limited to plastic. For example, the first lens may be made of glass. The first lens may have a small refractive index. For example, the refractive index of the first lens may be less than 1.6.

The second lens may have a refractive power. For example, the second lens may have negative refractive power. One surface of the second lens may be convex. For example, an object-side surface of the second lens may be convex.

The second lens may have an aspherical surface. For example, the object-side surface of the second lens may be aspherical. The second lens may be made of a material having a high light transmissivity and an excellent workability. For example, the second lens may be made of plastic. However, a material of the second lens is not limited to plastic. For example, the second lens may be made of glass. The second lens may have a refractive index greater than the refractive index of the first lens. For example, the refractive index of the second lens may be 1.65 or greater.

The third lens may have a refractive power. For example, the third lens may have a positive refractive power or a negative refractive power. The third lens may have a meniscus shape in which one surface is concave and the other surface is convex. For example, an object-side surface of the third lens may be convex and an image-side surface thereof may be concave, or the object-side surface of the third lens may be concave and the image-side surface thereof may be convex.

The third lens may have a spherical surface. For example, the object-side surface of the third lens may be spherical, and the image-side surface thereof may be aspherical. The third lens may be made of a material having a high light transmissivity and an excellent workability. For example, the third lens may be made of plastic. However, a material of the third lens is not limited to plastic. For example, the third lens may be made of glass. The third lens may have a refractive index greater than the refractive index of the first lens. For example, the refractive index of the third lens may be 1.6 or greater.

The fourth lens may have a refractive power. For example, the fourth lens may have a positive refractive power or a negative refractive power. One surface of the fourth lens may be concave. For example, the object-side surface of the fourth lens may be concave.

The fourth lens may have a spherical surface. For example, the object-side surface of the fourth lens may be spherical, and an image-side surface thereof may be aspherical. The fourth lens may be made of a material having a high light transmissivity and an excellent workability. For example, the fourth lens may be made of plastic. However, a material of the fourth lens is not limited to plastic. For example, the fourth lens may be made of glass. The fourth lens may have a refractive index that is substantially equal to the refractive index of the first lens. For example, the refractive index of the fourth lens may be less than 1.6.

The fifth lens may have a refractive power. For example, the fifth lens may have a negative refractive power. One surface of the fifth lens may be concave. For example, an object-side surface of the fifth lens may be concave. The fifth lens may have an inflection point. For example, either one or both of the object-side surface and an image-side surface of the fifth lens may have an inflection point.

The fifth lens may have an aspherical surface. For example, both surfaces of the fifth lens may be aspherical. The fifth lens may be made of a material having a high light transmissivity and an excellent workability. For example, the fifth lens may be made of plastic. However, a material of the fifth lens is not limited to plastic. For example, the fifth lens may be made of glass. The fifth lens may have a refractive index that is substantially equal to the refractive index of the first lens and the fourth lens. For example, the refractive index of the fifth lens may be less than 1.6.

The sixth lens may have a refractive power. For example, the sixth lens may have a positive refractive power or a negative refractive power. One surface of the sixth lens may be concave. For example, an object-side surface of the sixth lens may be concave.

The sixth lens may have an aspherical surface. For example, both surfaces of the sixth lens may be aspherical. The sixth lens may be made of a material having a high light transmissivity and an excellent workability. For example, the sixth lens may be made of plastic. However, a material of the sixth lens is not limited to plastic. For example, the sixth lens may be made of glass. The sixth lens may have a refractive index greater than the refractive index of the first lens. For example, the refractive index of the sixth lens may be 1.6 or greater.

The aspherical surfaces of the first to sixth lenses are represented by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Ir^{20} \quad (1)$$

In Equation 1, c is an inverse of a radius of curvature of the lens, k is a conic constant, r is a distance from a certain point on an aspherical surface of the lens to an optical axis of the lens, A to J are aspherical constants, and Z (or sag) is a distance between the certain point on the aspherical surface of the lens at the distance r and a tangential plane meeting the apex of the aspherical surface of the lens.

The optical imaging system may further include a filter, an image sensor, and a stop.

The filter may be disposed between the sixth lens and the image sensor. The filter may block some wavelengths of light. For example, the filter may block infrared wavelengths of light.

The image sensor may form the imaging plane. For example, a surface of the image sensor may form the imaging plane.

The stop may be disposed to control an amount of light incident to the image sensor. For example, the stop may be disposed between the second lens and the third lens, but is not limited to this position.

The optical imaging system may satisfy one or more of Conditional Expressions 1 through 7 below.

$0.7<TL/f<1.0$ (Conditional Expression 1)

$0<D45/TL<0.2$ (Conditional Expression 2)

$1.5<Nd6<1.7$ (Conditional Expression 3)

$f2/f<-0.6$ (Conditional Expression 4)

$2.0<f/\text{EPD}<2.7$ (Conditional Expression 5)

$|f2/f3|<1.3$ (Conditional Expression 6)

$TL/2<f1$ (Conditional Expression 7)

In the above Conditional Expressions 1 through 7, TL is a distance from the object-side surface of the first lens to the imaging plane, f is an overall focal length of the optical imaging system, D45 is a distance from the image-side surface of the fourth lens to the object-side surface of the fifth lens, Nd6 is a refractive index of the sixth lens, f1 is a focal length of the first lens, f2 is a focal length of the second lens, f3 is a focal length of the third lens, and EPD is an entrance pupil diameter of the optical imaging system. The f-number (F No.) of the optical imaging system is equal to f/EPD, and thus f/EPD in Conditional Expression 5 above is equal to the f-number (F No.) of the optical imaging system. Tables 1, 3, 5, and 7 that appear later in this application list the f-number (F No.) of first to fourth examples of an optical imaging system described later in this application.

Conditional Expression 1 is a condition for miniaturizing the optical imaging system. For example, when TL/f is outside of an upper limit value of Conditional Expression 1, it is difficult to miniaturize the optical imaging system, making it difficult to mount the optical imaging system in a mobile communications terminal, and when TL/f is outside of a lower limit value of Conditional Expression 1, it is difficult to manufacture the optical imaging system.

Conditional Expression 2 is a condition for ensuring both good telescopic characteristics of the optical imaging system and good resolution of the optical imaging system. For example, when D45/TL is outside of a lower limit value of Conditional Expression 2, it is difficult to maintain the resolution of the optical imaging system, and when D45/TL is outside of an upper limit value of Conditional Expression 2, the telescopic characteristics of the optical imaging system are deteriorated.

Conditional Expression 3 is a condition for improving aberration through the sixth lens. For example, when the refractive index of the sixth lens is outside of a numerical range of Conditional Expression 3, it is difficult to correct astigmatism, longitudinal chromatic aberration, and chromatic aberration of magnification.

Conditional Expression 4 is a condition for ensuring easy manufacturing of the second lens. For example, when f2/f is outside of an upper limit value of Conditional Expression 4, the second lens has a large optical sensitivity, making it difficult to manufacture the second lens.

Conditional Expression 5 is a condition for implementing a bright optical imaging system.

Conditional Expression 6 is a condition for significantly decreasing aberration through the second lens and the third lens. For example, when |f2/f3| is outside of an upper limit value of Conditional Expression 6, the aberration is increased, thereby decreasing the resolution of the optical imaging system.

Next, several examples of an optical imaging system will be described.

FIG. 1 is a view illustrating a first example of an optical imaging system.

Referring to FIG. 1, an optical imaging system 100 includes a first lens 110, a second lens 120, a third lens 130, a fourth lens 140, a fifth lens 150, and a sixth lens 160.

The first lens 110 has a positive refractive power, an object-side surface thereof is convex, and an image-side surface thereof is concave. The second lens 120 has a negative refractive power, an object-side surface thereof is convex, and an image-side surface thereof is concave. The third lens 130 has a positive refractive power, an object-side surface thereof is concave, and an image-side surface thereof is convex. The fourth lens 140 has a negative refractive power, an object-side surface thereof is concave, and an image-side surface thereof is concave. The fifth lens 150 has a negative refractive power, an object-side surface thereof is concave, and an image-side surface thereof is concave. Both surfaces of the fifth lens 150 have inflection points. The sixth lens 160 has a positive refractive power, an object-side surface thereof is concave, and an image-side surface thereof is convex. The optical imaging system 100 has a narrow field of view. For example, the optical imaging system 100 has a field of view of 40° or less. In detail, the field of view of the optical imaging system 100 is θ=25.32.

The optical imaging system 100 further includes a filter 170, an image sensor 180, and a stop ST. The filter 170 is disposed between the sixth lens 160 and the image sensor 180, and the stop ST is disposed between the second lens 120 and the third lens 130, but is not limited to this position.

Figure 2:
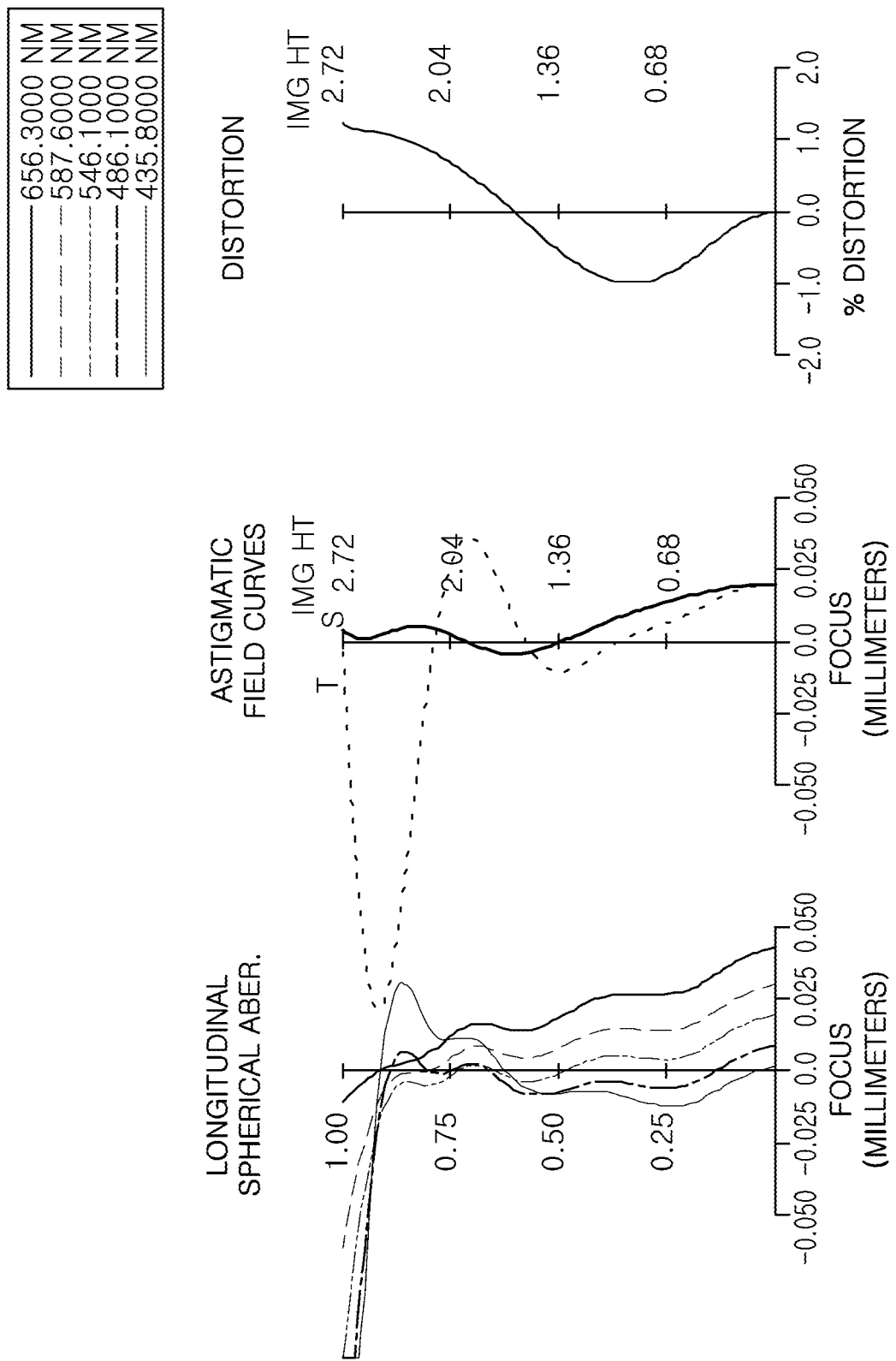
FIG. 2 illustrates aberration curves of the optical imaging system illustrated in FIG. 1.

FIG. 2 illustrates aberration curves of the optical imaging system illustrated in FIG. 1.

Table 1 below lists characteristics of the optical imaging system illustrated in FIG. 1, and Table 2 below lists aspherical values of the lenses of the optical imaging system illustrated in FIG. 1.

TABLE 1

First Example f = 5.75

F No. = 2.28

θ = 25.32°

TL = 5.240

| Surface No. | Element | Radius of Curvature | Thickness/ Distance | Refractive Index | Abbe No. | Focal Length |
|---|---|---|---|---|---|---|
| S1 | First Lens | 1.4433 | 0.9847 | 1.544 | 56.00 | 2.645 |
| S2 | | 728.5499 | 0.2000 | | | |
| S3 | Second | 13.0590 | 0.2336 | 1.661 | 20.40 | −3.805 |
| S4 | Lens | 2.1141 | 0.1285 | | | |
| | Stop | Infinity | 0.1001 | | | |
| S5 | Third | −36.0676 | 0.2356 | 1.650 | 21.47 | 9.663 |
| S6 | Lens | −5.4150 | 0.1000 | | | |
| S7 | Fourth | −12.1269 | 0.2300 | 1.544 | 56.00 | −9.342 |
| S8 | Lens | 8.8765 | 0.6050 | | | |
| S9 | Fifth Lens | −47.3505 | 0.3875 | 1.544 | 56.00 | −6.767 |
| S10 | | 4.0230 | 0.5563 | | | |
| S11 | Sixth Lens | −10.5945 | 0.6078 | 1.650 | 21.47 | 32.233 |
| S12 | | −7.2239 | 0.1001 | | | |
| S13 | Filter | Infinity | 0.2100 | 1.519 | 64.20 | |
| S14 | | Infinity | 0.5804 | | | |
| S15 | Imaging Plane | Infinity | −0.0196 | | | |

TABLE 2

| First Example | Radius of Curvature | K | A | B | C | D | E | F | G | H | J |
|---|---|---|---|---|---|---|---|---|---|---|---|
| S1 | 1.443 | −0.365 | 0.008 | 0.017 | −0.054 | 0.141 | −0.223 | 0.197 | −0.090 | 0.016 | 0.000 |
| S2 | 728.550 | 0.000 | 0.055 | −0.037 | −0.047 | 0.123 | −0.151 | 0.090 | −0.023 | 0.002 | 0.000 |
| S3 | 13.059 | 0.000 | 0.015 | −0.047 | 0.502 | −2.580 | 7.960 | −14.586 | 15.821 | −9.320 | 2.307 |
| S4 | 2.114 | −8.148 | −0.007 | 0.163 | −1.304 | 4.341 | −8.515 | 9.083 | −2.452 | −3.068 | 1.922 |
| S5 | −36.068 | 84.363 | 0.007 | −0.085 | −0.588 | 1.002 | −1.184 | 1.712 | −1.247 | 0.000 | 0.000 |
| S6 | −5.415 | −34.536 | 0.225 | 0.857 | −11.874 | 91.722 | −436.916 | 1301.853 | −2356.42 | 2362.081 | −1003.98 |
| S7 | −12.127 | 84.778 | 0.112 | 0.274 | −0.966 | 6.410 | −19.477 | 31.752 | −28.594 | 11.168 | 0.000 |
| S8 | 8.877 | 98.900 | −0.141 | 0.282 | −0.566 | 3.297 | −9.778 | 16.220 | −14.129 | 4.842 | 0.000 |
| S9 | −47.351 | 99.000 | −0.229 | −0.081 | 0.695 | −2.066 | 3.613 | −3.636 | 2.059 | −0.604 | 0.071 |
| S10 | 4.023 | −63.019 | −0.088 | −0.035 | 0.097 | −0.139 | 0.137 | −0.082 | 0.028 | −0.005 | 0.000 |
| S11 | −10.595 | −99.000 | −0.102 | 0.105 | −0.069 | 0.019 | 0.000 | 0.001 | −0.001 | 0.000 | 0.000 |
| S12 | −7.224 | 0.000 | −0.128 | 0.124 | −0.120 | 0.095 | −0.054 | 0.020 | −0.005 | 0.001 | 0.000 |

Figure 3:
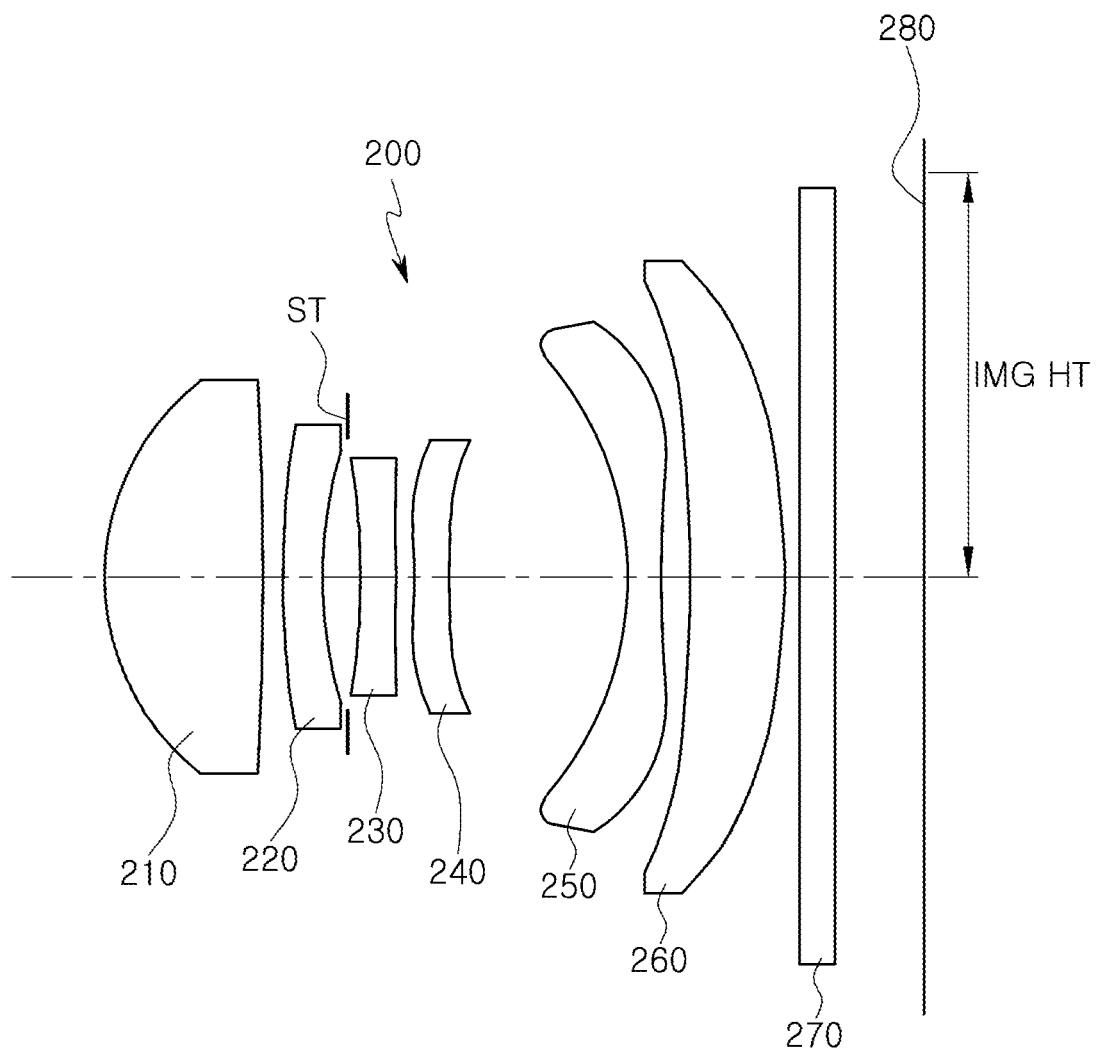
FIG. 3 is a view illustrating a second example of an optical imaging system.

FIG. 3 is a view illustrating a second example of an optical imaging system.

Referring to FIG. 3, an optical imaging system 200 includes a first lens 210, a second lens 220, a third lens 230, a fourth lens 240, a fifth lens 250, and a sixth lens 260.

The first lens 210 has a positive refractive power, an object-side surface thereof is convex, and an image-side surface thereof is convex. The second lens 220 has a negative refractive power, an object-side surface thereof is convex, and an image-side surface thereof is concave. The third lens 230 has a positive refractive power, an object-side surface thereof is concave, and an image-side surface thereof is convex. The fourth lens 240 has a negative refractive power, an object-side surface thereof is concave, and an image-side surface thereof is concave. The fifth lens 250 has a negative refractive power, an object-side surface thereof is concave, and an image-side surface thereof is concave. Both surfaces of the fifth lens 250 have inflection points. The sixth lens 260 has a positive refractive power, an object-side surface thereof is concave, and an image-side surface thereof is convex. The optical imaging system 200 has a narrow field of view. For example, the optical imaging system 200 has a field of view of 40° or less. In detail, the field of view of the optical imaging system 200 is θ=24.89.

The optical imaging system 200 further includes a filter 270, an image sensor 280, and a stop ST. The filter 270 is disposed between the sixth lens 260 and the image sensor 280, and the stop ST is disposed between the second lens 220 and the third lens 230, but is not limited to this position.

Figure 4:
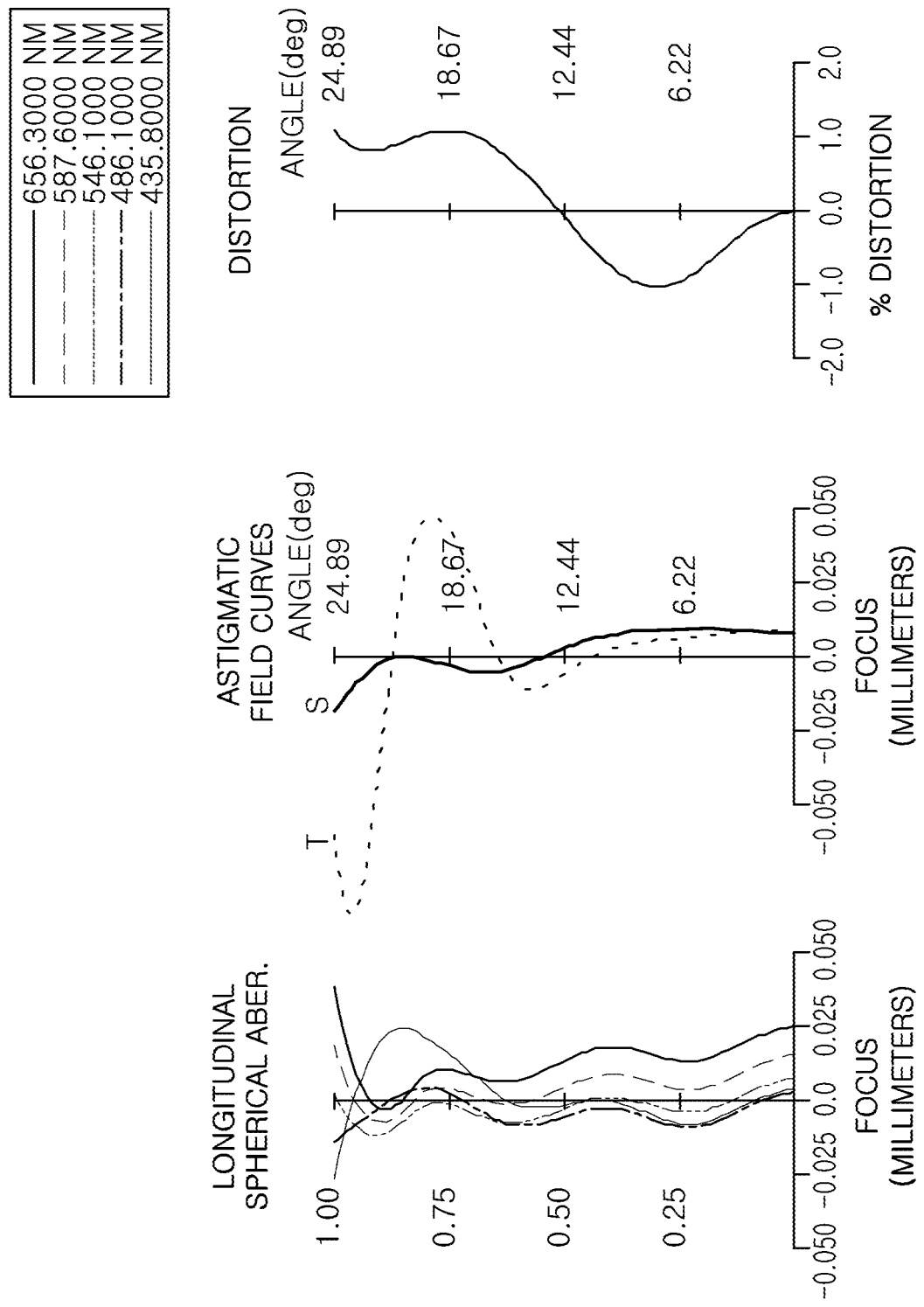
FIG. 4 illustrates aberration curves of the optical imaging system illustrated in FIG. 3.

FIG. 4 illustrates aberration curves of the optical imaging system illustrated in FIG. 3.

Table 3 below lists characteristics of the optical imaging system illustrated in FIG. 3, and Table 4 below lists aspherical values of the lenses of the optical imaging system illustrated in FIG. 3.

TABLE 3

Second Example
f = 5.60
F No. = 2.43
θ = 24.89°
TL = 5.000

| Surface No. | Element | Radius of Curvature | Thickness/ Distance | Refractive Index | Abbe No. | Focal Length |
|---|---|---|---|---|---|---|
| S1 | First | 1.4056 | 0.9417 | 1.544 | 56.00 | 2.510 |
| S2 | Lens | −43.4165 | 0.1600 | | | |
| S3 | Second | 11.0320 | 0.2300 | 1.661 | 20.40 | −3.745 |
| S4 | Lens | 2.0239 | 0.1168 | | | |
| | Stop | Infinity | 0.1000 | | | |
| S5 | Third | −31.2658 | 0.2326 | 1.6504 | 21.47 | 14.507533 |
| S6 | Lens | −7.3295 | 0.1000 | | | |
| S7 | Fourth | −21.7194 | 0.2300 | 1.544 | 56.00 | −11.052 |
| S8 | Lens | 8.3983 | 1.0848 | | | |
| S9 | Fifth | −3.8000 | 0.2300 | 1.544 | 56.00 | −6.049 |
| S10 | Lens | 25.9530 | 0.1397 | | | |
| S11 | Sixth | −10.9009 | 0.5845 | 1.650 | 21.47 | 89.119 |
| S12 | Lens | −9.3863 | 0.1002 | | | |
| S13 | Filter | Infinity | 0.2000 | 1.519 | 64.20 | |
| S14 | | Infinity | 0.5576 | | | |
| S15 | Imaging Plane | Infinity | −0.0078 | | | |

TABLE 4

| Second Example | Radius of Curvature | K | A | B | C | D | E | F | G | H | J |
|---|---|---|---|---|---|---|---|---|---|---|---|
| S1 | 1.406 | −0.350 | 0.009 | 0.025 | −0.076 | 0.219 | −0.381 | 0.371 | −0.186 | 0.036 | 0.000 |
| S2 | −43.416 | 0.000 | 0.074 | −0.048 | −0.066 | 0.191 | −0.258 | 0.170 | −0.048 | 0.004 | 0.000 |
| S3 | 11.032 | 0.000 | 0.007 | −0.060 | 0.701 | −4.005 | 13.613 | −27.505 | 32.899 | −21.361 | 5.831 |
| S4 | 2.024 | −8.405 | 0.000 | 0.211 | −1.845 | 6.688 | −14.564 | 17.127 | −5.097 | −7.031 | 4.856 |
| S5 | −31.266 | −99.000 | 0.001 | −0.151 | −0.819 | 1.547 | −2.024 | 3.228 | −2.592 | 0.000 | 0.000 |
| S6 | −7.330 | 80.652 | 0.208 | 1.053 | −16.708 | 142.469 | −747.274 | 2454.835 | −4898.83 | 5413.925 | −2537.00 |
| S7 | −21.719 | 99.000 | 0.122 | 0.347 | −1.350 | 9.952 | −33.312 | 59.873 | −59.445 | 25.598 | 0.000 |
| S8 | 8.398 | 99.000 | −0.026 | 0.283 | −0.780 | 5.214 | −16.852 | 30.585 | −29.373 | 11.099 | 0.000 |
| S9 | −3.800 | 3.952 | 0.064 | −1.153 | 3.086 | −5.298 | 6.160 | −4.674 | 2.189 | −0.569 | 0.062 |
| S10 | 25.953 | 70.469 | 0.096 | −0.730 | 1.856 | −2.874 | 2.725 | −1.593 | 0.561 | −0.110 | 0.009 |
| S11 | −10.901 | −99.000 | −0.159 | 0.496 | −0.585 | 0.325 | −0.070 | −0.012 | 0.009 | −0.002 | 0.000 |
| S12 | −9.386 | 0.000 | −0.233 | 0.363 | −0.375 | 0.295 | −0.177 | 0.074 | −0.019 | 0.003 | 0.000 |

Figure 5:
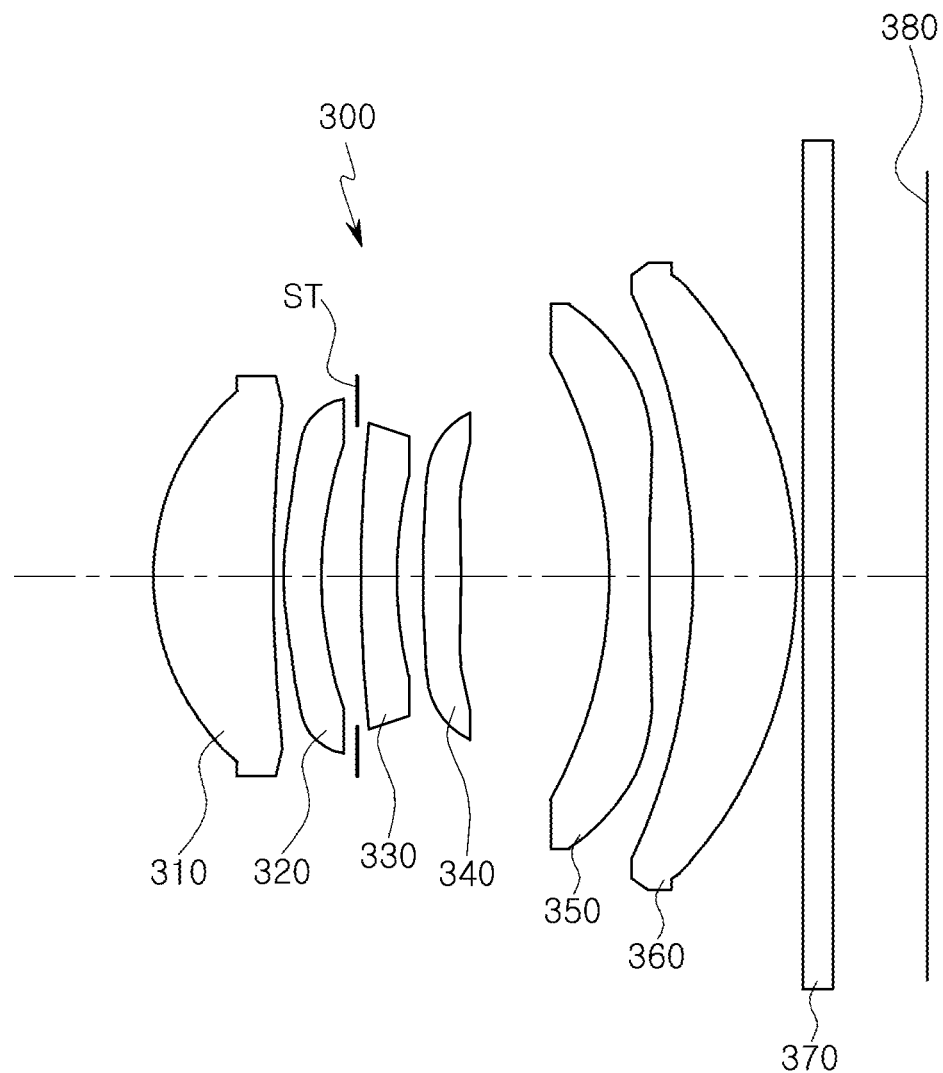
FIG. 5 is a view illustrating a third example of an optical imaging system.

FIG. 5 is a view illustrating a third example of an optical imaging system.

Referring to FIG. 5, an optical imaging system 300 includes a first lens 310, a second lens 320, a third lens 330, a fourth lens 340, a fifth lens 350, and a sixth lens 360.

The first lens 310 has a positive refractive power, an object-side surface thereof is convex, and an image-side surface thereof is concave. The second lens 320 has a negative refractive power, an object-side surface thereof is convex, and an image-side surface thereof is concave. The third lens 330 has a negative refractive power, an object-side surface thereof is convex, and an image-side surface thereof is concave. One surface of the third lens 330 is a spherical surface and the other surface of the third lens is an aspherical surface. For example, an object-side surface of the third lens 330 is a spherical surface, and an image-side surface thereof is an aspherical surface. The fourth lens 340 has a positive refractive power, an object-side surface thereof is concave, and an image-side surface thereof is convex. The fifth lens 350 has a negative refractive power, an object-side surface thereof is concave, and an image-side surface thereof is concave. Both surfaces of the fifth lens 350 have inflection points. The sixth lens 360 has a positive refractive power, an object-side surface thereof is concave, and an image-side surface thereof is convex. The optical imaging system 300 has a narrow field of view. For example, the optical imaging system 300 has a field of view of 40° or less. In detail, the field of view of the optical imaging system 300 is θ=24.41.

The optical imaging system 300 further includes a filter 370, an image sensor 380, and a stop ST. The filter 370 is disposed between the sixth lens 360 and the image sensor 380, and the stop ST is disposed between the second lens 320 and the third lens 330, but is not limited to this position.

Figure 6:
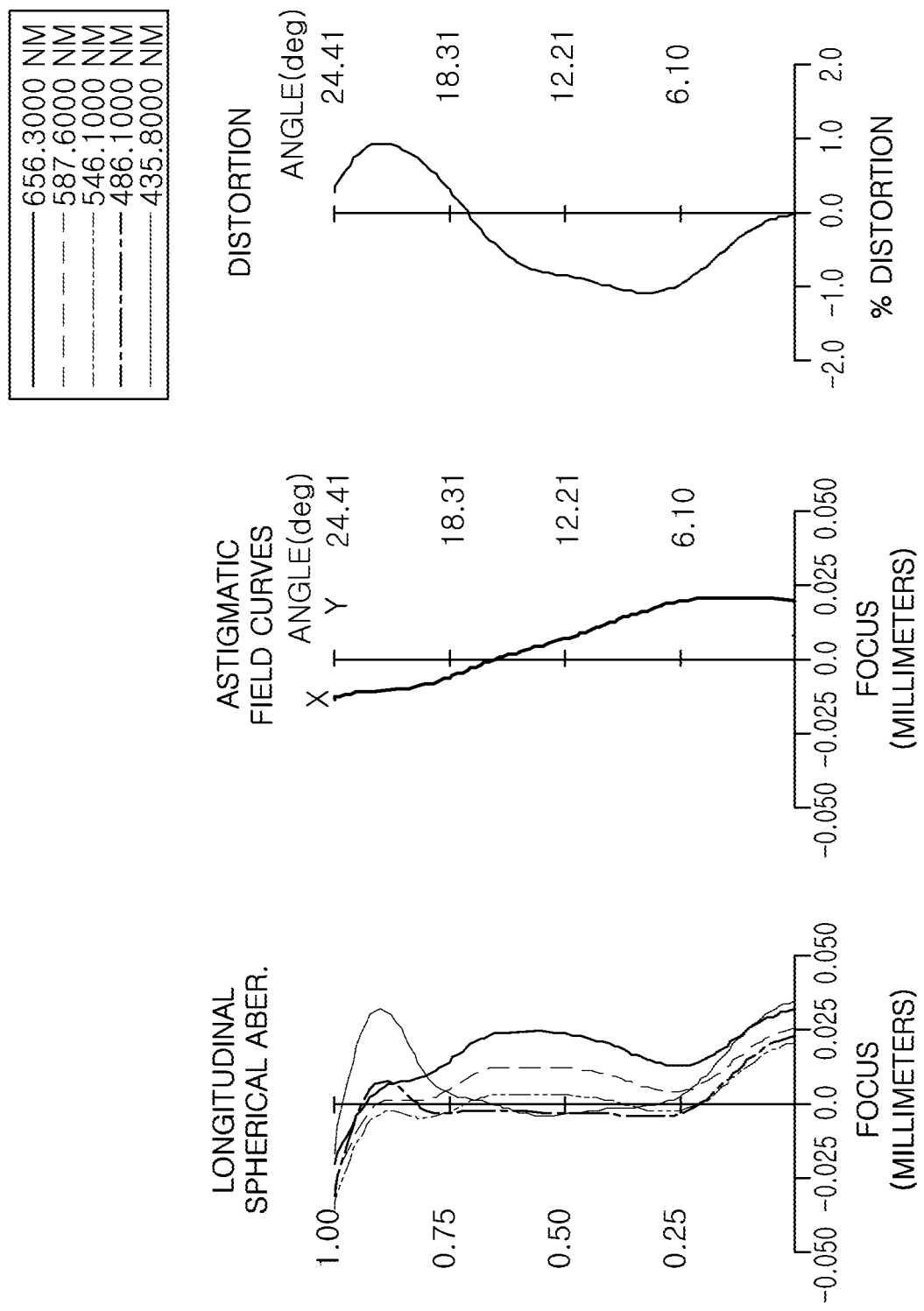
FIG. 6 illustrates aberration curves of the optical imaging system illustrated in FIG. 5.

FIG. 6 illustrates aberration curves of the optical imaging system illustrated in FIG. 5.

Table 5 below lists characteristics of the optical imaging system illustrated in FIG. 5, and Table 6 below lists aspherical values of the lenses of the optical imaging system illustrated in FIG. 5.

TABLE 5

Third Example
f = 6.00
F No. = 2.65
θ = 24.41°
TL = 5.290

| Surface No. | Element | Radius of Curvature | Thickness/ Distance | Refractive Index | Abbe No. | Focal Length |
|---|---|---|---|---|---|---|
| S1 | First Lens | 1.4144 | 0.8510 | 1.544 | 56.00 | 2.657 |
| S2 | | 43.0741 | 0.0500 | | | |
| S3 | Second | 4.4611 | 0.2390 | 1.661 | 20.40 | −8.0591 |
| S4 | Lens | 2.3883 | 0.1000 | | | |
| Stop | | Infinity | 0.2000 | | | |
| S5 | Third | 107.8754 | 0.2400 | 1.6504 | 21.47 | −6.6326 |
| S6 | Lens | 4.1871 | 0.1674 | | | |
| S7 | Fourth | −89.6829 | 0.2300 | 1.544 | 56.00 | 206.347 |
| S8 | Lens | −50.0000 | 1.0270 | | | |
| S9 | Fifth Lens | −3.1691 | 0.2900 | 1.544 | 56.00 | −4.7817 |
| S10 | | 15.3784 | 0.2648 | | | |
| S11 | Sixth Lens | −151.2417 | 0.7458 | 1.650 | 21.47 | 12.560 |
| S12 | | −7.8450 | 0.0400 | | | |
| S13 | Filter | Infinity | 0.2100 | 1.519 | 64.20 | |
| S14 | | Infinity | 0.6550 | | | |
| S15 | Imaging Plane | Infinity | −0.0200 | | | |

TABLE 6

| Third Example | Radius of Curvature | K | A | B | C | D | E | F | G | H | J |
|---|---|---|---|---|---|---|---|---|---|---|---|
| S1 | 1.414 | −0.351 | 0.009 | 0.020 | −0.070 | 0.193 | −0.314 | 0.290 | −0.142 | 0.027 | 0.000 |
| S2 | 43.074 | 0.000 | 0.128 | −0.168 | −0.043 | 0.424 | −0.775 | 0.729 | −0.348 | 0.066 | 0.000 |
| S3 | 4.461 | 0.000 | 0.096 | −0.159 | 0.128 | −0.643 | 2.682 | −5.660 | 6.569 | −3.906 | 0.930 |
| S4 | 2.388 | −2.596 | −0.020 | 0.168 | −1.169 | 4.180 | −8.515 | 9.083 | −2.452 | −3.068 | 1.922 |
| S5 | 107.875 | | | | | | | | | | |
| S6 | 4.187 | −23.505 | 0.104 | 1.252 | −17.486 | 152.975 | −818.990 | 2735.879 | −5553.53 | 6268.187 | −3016.83 |
| S7 | −89.683 | −99.000 | 0.129 | −0.017 | 0.103 | 0.000 | 0.000 | 0.000 | 0.000 | 0.000 | 0.000 |
| S8 | −50.000 | −99.000 | 0.154 | 0.000 | 0.000 | 0.000 | 0.000 | 0.000 | 0.000 | 0.000 | 0.000 |
| S9 | −3.169 | −2.527 | −0.044 | 0.217 | −0.907 | 1.760 | −1.927 | 1.269 | −0.500 | 0.109 | −0.010 |
| S10 | 15.378 | 22.815 | −0.100 | 0.422 | −0.991 | 1.223 | −0.909 | 0.424 | −0.122 | 0.020 | −0.001 |
| S11 | −151.242 | −99.000 | −0.166 | 0.427 | −0.594 | 0.453 | −0.201 | 0.051 | −0.007 | 0.000 | 0.000 |
| S12 | −7.845 | 0.000 | −0.159 | 0.198 | −0.154 | 0.055 | −0.001 | −0.007 | 0.002 | 0.000 | 0.000 |

Figure 7:
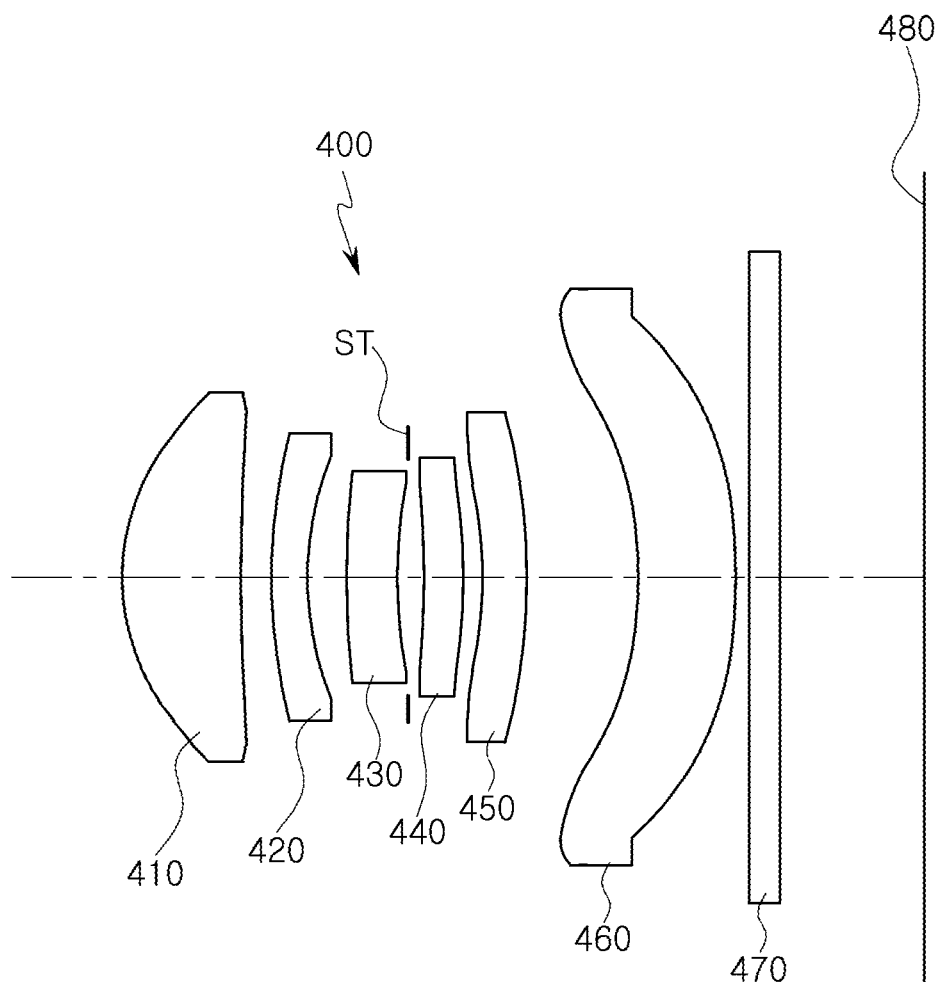
FIG. 7 is a view illustrating a fourth example of an optical imaging system.

FIG. 7 is a view illustrating a fourth example of an optical imaging system.

Referring to FIG. 7, an optical imaging system 400 includes a first lens 410, a second lens 420, a third lens 430, a fourth lens 440, a fifth lens 450, and a sixth lens 460.

The first lens 410 has a positive refractive power, an object-side surface thereof is convex, and an image-side surface thereof is concave. The second lens 420 has a negative refractive power, an object-side surface thereof is convex, and an image-side surface thereof is concave. The third lens 430 has a positive refractive power, an object-side surface thereof is convex, and an image-side surface thereof is concave. The fourth lens 440 has a positive refractive power, an object-side surface thereof is concave, and an image-side surface thereof is convex. One surface of the fourth lens 440 is a spherical surface, and the other surface of the fourth lens 440 is an aspherical surface. For example, an object-side surface of the fourth lens 440 is a spherical surface, and an image-side surface of the fourth lens 440 is an aspherical surface. The fifth lens 450 has a negative refractive power, an object-side surface thereof is concave, and an image-side surface thereof is convex. Both surfaces of the fifth lens 450 have inflection points. The sixth lens 460 has a negative refractive power, an object-side surface thereof is concave, and an image-side surface thereof is convex. The optical imaging system 400 has a narrow field of view. For example, the optical imaging system 400 has a field of view of 40° or less. In detail, the field of view of the optical imaging system 400 is θ=25.07.

The optical imaging system 400 further includes a filter 470, an image sensor 480, and a stop ST. The filter 470 is disposed between the sixth lens 460 and the image sensor 480, and the stop ST is disposed between the third lens 430 and the fourth lens 440, but is not limited to this position.

Figure 8:
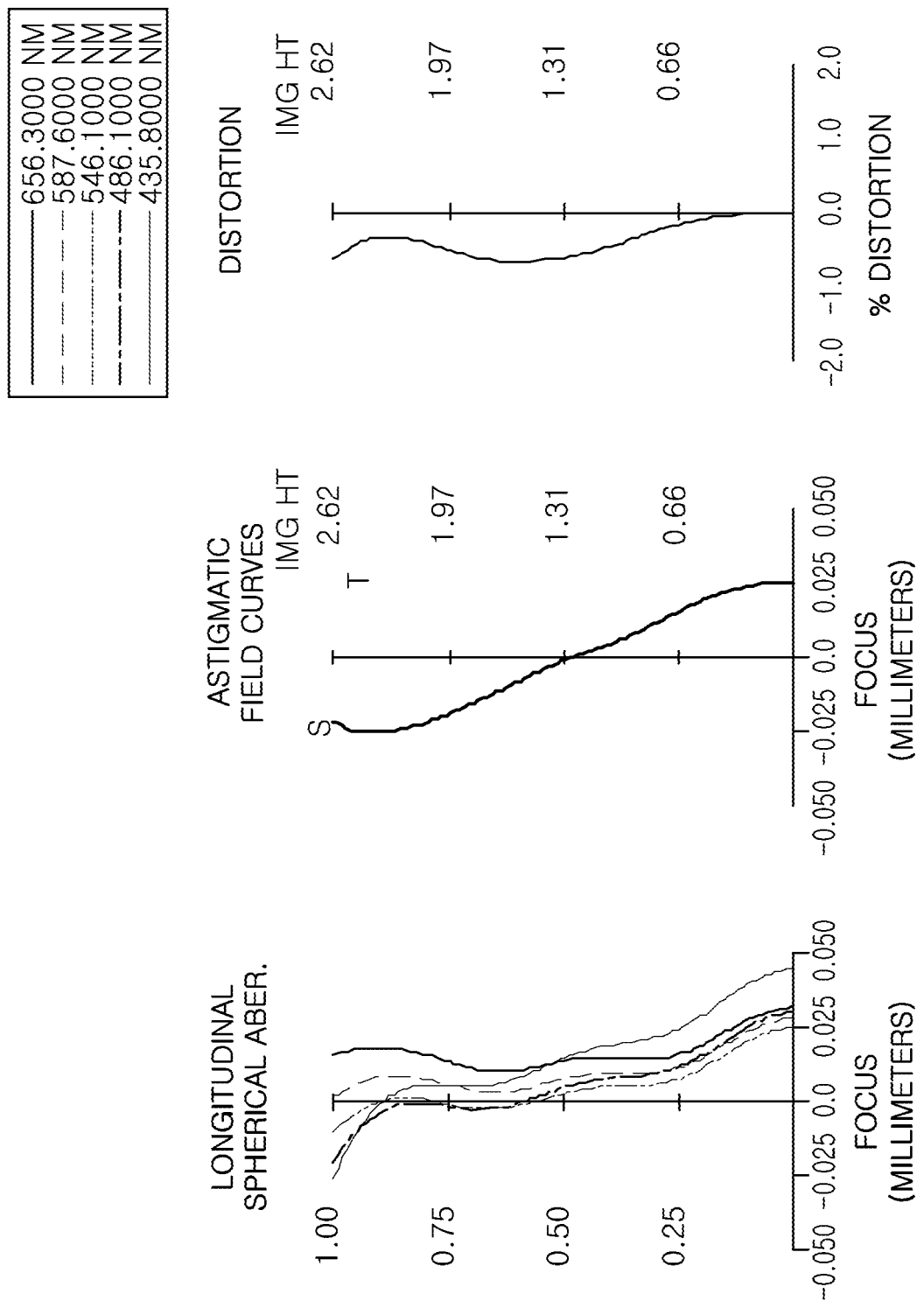
FIG. 8 illustrates aberration curves of the optical imaging system illustrated in FIG. 7.

FIG. 8 illustrates aberration curves of the optical imaging system illustrated in FIG. 7.

Table 7 below lists characteristics of the optical imaging system illustrated in FIG. 7, and Table 8 below lists aspherical values of the lenses of the optical imaging system illustrated in FIG. 7.

TABLE 7

Fourth Example
f = 5.60
F No. = 2.6
θ = 25.07°
TL = 5.280

| Surface No. | Element | Radius of Curvature | Thickness/ Distance | Refractive Index | Abbe No. | Focal Length |
|---|---|---|---|---|---|---|
| S1 | First Lens | 1.4365 | 0.7886 | 1.544 | 56.00 | 2.645 |
| S2 | | 186.1834 | 0.1998 | | | |
| S3 | Second | 5.9143 | 0.2341 | 1.661 | 20.40 | −3.780 |
| S4 | Lens | 1.7431 | 0.1564 | | | |
| S5 | Third | 4.6972 | 0.3376 | 1.6504 | 21.47 | 27.295 |
| S6 | Lens | 6.1815 | 0.1677 | | | |
| | Stop | Infinity | 0.1023 | | | |
| S7 | Fourth | −6.4326 | 0.2527 | 1.544 | 56.00 | 13.017 |
| S8 | Lens | −3.4249 | 0.1284 | | | |
| S9 | Fifth Lens | −2.0657 | 0.3000 | 1.544 | 56.00 | −7.373 |
| S10 | | −4.4563 | 0.7231 | | | |
| S11 | Sixth Lens | −5.0958 | 0.6336 | 1.650 | 21.47 | −19.746 |
| S12 | | −8.8027 | 0.1001 | | | |
| S13 | Filter | Infinity | 0.2100 | 1.519 | 64.20 | |
| S14 | | Infinity | 0.9707 | | | |
| S15 | Imaging Plane | Infinity | −0.0250 | | | |

Table 9 below lists values of Conditional Expressions 1 through 7 of the optical imaging systems of the first to fourth examples.

TABLE 9

| Conditional Expression | First Example | Second Example | Third Example | Fourth Example |
|---|---|---|---|---|
| TL/f | 0.9113 | 0.8929 | 0.8817 | 0.9429 |
| D45/TL | 0.1155 | 0.2170 | 0.1941 | 0.0243 |
| Nd6 | 1.650 | 1.650 | 1.650 | 1.650 |
| f2/f | −0.6617 | −0.6688 | −1.3432 | −0.6750 |
| f/EPD | 2.28 | 2.43 | 2.65 | 2.60 |
| |f2/f3| | −0.3938 | −0.2581 | 1.2151 | −0.1385 |
| TL/2 | 2.620 | 2.500 | 2.645 | 2.640 |

Figure 9:
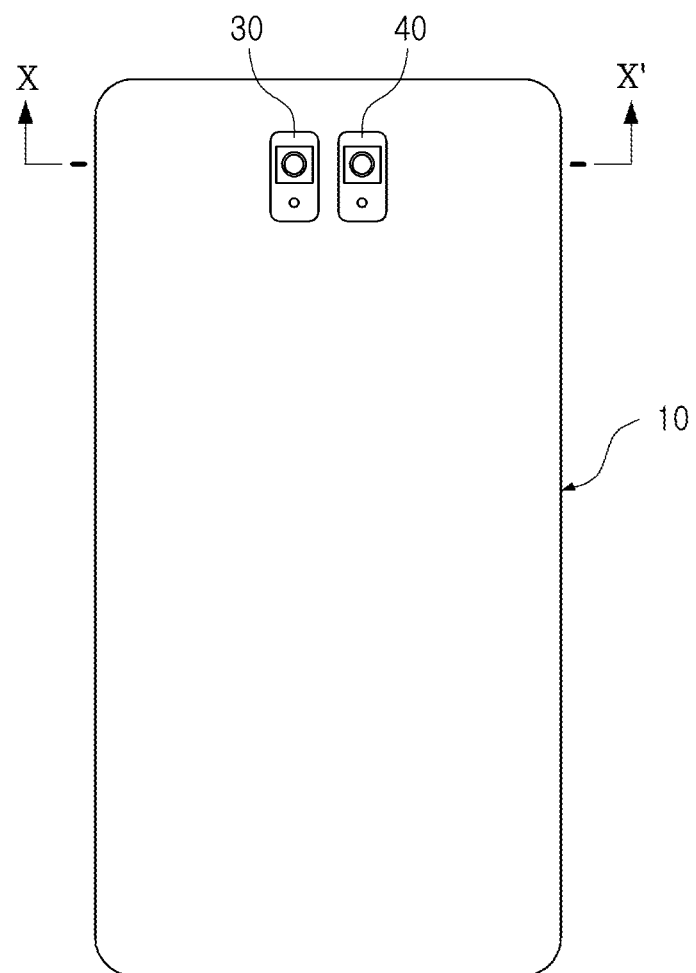
FIG. 9 is a rear view of an example of a mobile communications terminal in which an optical imaging system described in this application is mounted.
Figure 10:
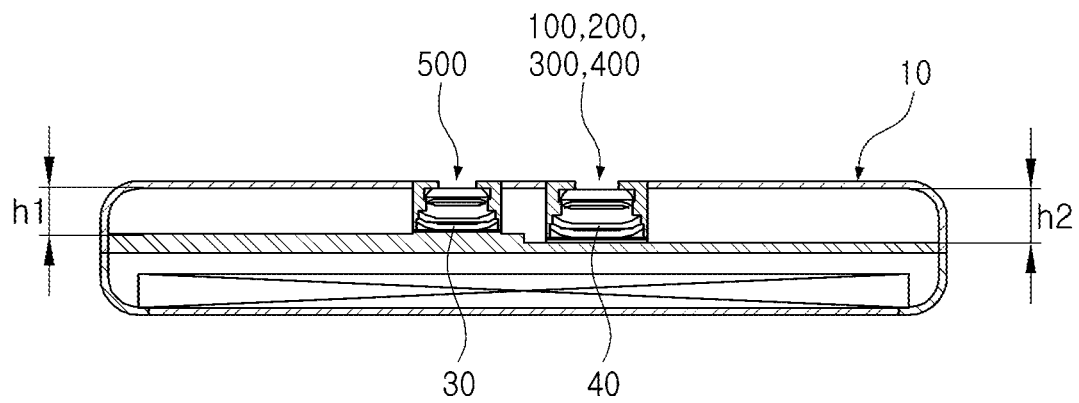
FIG. 10 is a cross-sectional view of the mobile communications terminal illustrated in FIG. 9 taken along the line X-X' in FIG. 9.

FIG. 9 is a rear view of an example of a mobile communications terminal in which an optical imaging system described in this application is mounted. FIG. 10 is a cross-sectional view of the mobile communications terminal illustrated in FIG. 9 taken along the line X-X' in FIG. 9.

Referring to FIGS. 9 and 10, a mobile communications terminal 10 includes a plurality of camera modules 30 and 40. A first camera module 30 includes a first optical imaging system 500 configured to capture an image of a subject positioned at a short distance away from the mobile communications terminal 10, and a second camera module 40 includes a second optical imaging system 100, 200, 300, or 400 configured to capture an image of a subject positioned at a long distance away from the mobile communications terminal 10.

The first optical imaging system 500 includes a plurality of lenses. For example, the first optical imaging system 500 may include four or more lenses. The first optical imaging system 500 is configured to an image of a subject positioned at a short distance away from the mobile communications terminal 10. For example, the first optical imaging system 500 may have a wide field of view of 50° or more, and a ratio (h1/Cf) may be 1.0 or h1 is a height of the first optical imaging system 500 and is equal to a total length of the first optical imaging system 500, and Cf is an overall focal length of the first optical imaging system 500.

The second optical imaging system 100, 200, 300, or 400 includes a plurality of lenses. For example, the second optical imaging system 100, 200, 300, or 400 may include six lenses. The second optical imaging system 100, 200, 300, or 400 is any one of the optical imaging systems of the first to fourth examples described above. The second optical imaging system 100, 200, 300, or 400 is configured to capture an image of a subject positioned at a long distance

TABLE 8

| Fourth Example | Radius of Curvature | K | A | B | C | D | E | F | G | H | J |
|---|---|---|---|---|---|---|---|---|---|---|---|
| S1 | 1.436 | −0.372 | 0.011 | 0.013 | −0.047 | 0.130 | −0.212 | 0.192 | −0.093 | 0.017 | 0.000 |
| S2 | 186.183 | 0.000 | 0.070 | −0.036 | −0.052 | 0.137 | −0.174 | 0.108 | −0.031 | 0.003 | 0.000 |
| S3 | 5.914 | 0.000 | 0.029 | −0.042 | 0.349 | −1.906 | 6.217 | −11.726 | 12.945 | −7.729 | 1.938 |
| S4 | 1.743 | −4.367 | −0.020 | 0.168 | −1.169 | 4.180 | −8.515 | 9.083 | −2.452 | −3.068 | 1.922 |
| S5 | 4.697 | −62.851 | 0.026 | −0.017 | −0.865 | 2.811 | −6.313 | 8.030 | −4.260 | 0.000 | 0.000 |
| S6 | 6.181 | −99.000 | 0.141 | 0.892 | −12.279 | 95.633 | −463.919 | 1418.924 | −2656.30 | 2773.752 | −1236.64 |
| S7 | −6.433 | | | | | | | | | | |
| S8 | −3.425 | 9.589 | 0.037 | 0.199 | −0.585 | 3.521 | −10.093 | 16.342 | −14.307 | 5.023 | 0.000 |
| S9 | −2.066 | −8.746 | −0.130 | 0.396 | −0.247 | 0.582 | −0.969 | 0.485 | 0.025 | −0.076 | 0.015 |
| S10 | −4.456 | −58.287 | −0.171 | 0.256 | −0.198 | 0.078 | 0.060 | −0.118 | 0.068 | −0.017 | 0.002 |
| S11 | −5.096 | −99.000 | −0.249 | 0.187 | −0.171 | 0.127 | −0.045 | 0.003 | 0.002 | −0.001 | 0.000 |
| S12 | −8.803 | 0.000 | −0.114 | 0.012 | 0.057 | −0.096 | 0.080 | −0.038 | 0.011 | −0.002 | 0.000 | away from the mobile communications terminal 10. For example, the second optical imaging system 100, 200, 300, or 400 may have a narrow field of view of 40° or less, and a ratio (h2/f) may be less than 1.0, where h2 is a height of the second optical imaging system 100, 200, 300, or 400 and is equal to the total length TL of the second optical imaging system, and f is the overall focal length of the second optical imaging system 100, 200, 300, or 400.

The examples described above provide an optical imaging system capable of capturing an image of a subject at a long distance and being mounted in a small terminal.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens having an image-side surface that is concave;
   a second lens having a refractive power;
   a third lens having positive refractive power, and a concave object-side surface;
   a fourth lens having a refractive power and a concave image-side surface;
   a fifth lens having negative refractive power and a concave object-side surface; and
   a sixth lens having a refractive power and an object-side surface that is concave,
   wherein the first lens through the sixth lens are sequentially disposed in numerical order from an object side of the optical imaging system toward an imaging plane of the optical imaging system so that there is a first air gap between the first lens and the second lens, a second air gap between the second lens and the third lens, a third air gap between the third lens and the fourth lens, a fourth air gap between the fourth lens and the fifth lens, and a fifth air gap between the fifth lens and the sixth lens, and
   the optical imaging system satisfies the following conditional expression:

$0.7 < TL/f < 1.0$ where TL is a distance from an object-side surface of the first lens to the imaging plane, and f is an overall focal length of the optical imaging system.

2. The optical imaging system of claim 1, wherein the optical imaging system further satisfies the following conditional expression:

$0 < D45/TL < 0.2$ where D45 is a distance from an image-side surface of the fourth lens to an object-side surface of the fifth lens.

3. The optical imaging system of claim 1, wherein the optical imaging system further satisfies the following conditional expression:

$1.5 < Nd6 < 1.7$ where Nd6 is a refractive index of the sixth lens.

4. The optical imaging system of claim 1, wherein the optical imaging system further satisfies the following conditional expression:

$f2/f < -0.6$ where f2 is a focal length of the second lens.

5. The optical imaging system of claim 1, wherein the optical imaging system further satisfies the following conditional expression:

$2.0 < f/EPD < 2.7$ where EPD is an entrance pupil diameter of the optical imaging system.

6. The optical imaging system of claim 1, wherein the optical imaging system further satisfies the following conditional expression:

$|f2/f3| < 1.3$ where f2 is a focal length of the second lens, and f3 is a focal length of the third lens.

* * * * *